No. 898,207. PATENTED SEPT. 8, 1908.
R. E. FLEMING.
CHURN OPERATING MECHANISM.
APPLICATION FILED MAY 29, 1908.

2 SHEETS—SHEET 1.

Witnesses

Inventor
Ratio E. Fleming
By
Attorneys

No. 898,207. PATENTED SEPT. 8, 1908.
R. E. FLEMING.
CHURN OPERATING MECHANISM.
APPLICATION FILED MAY 29, 1908.
2 SHEETS—SHEET 2.
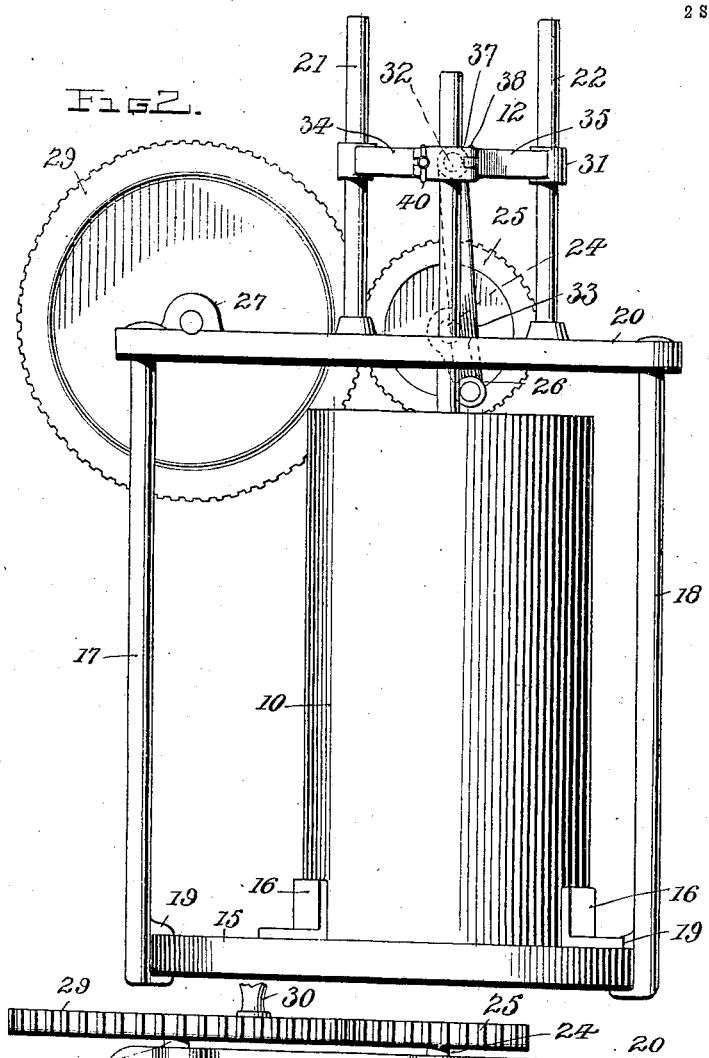
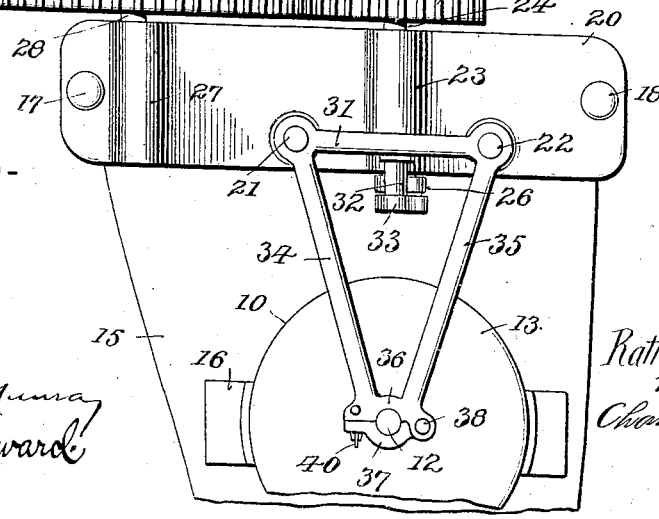
Witnesses
Inventor
Ratio E. Fleming
by
Chandler & Chandler
Attorneys

UNITED STATES PATENT OFFICE.

RATIO E. FLEMING, OF MEXICO, MISSOURI.

CHURN-OPERATING MECHANISM.

No. 898,207.  Specification of Letters Patent.  Patented Sept. 8, 1908.

Application filed May 29, 1908. Serial No. 435,768.

*To all whom it may concern:*

Be it known that I, RATIO E. FLEMING, a citizen of the United States, residing at Mexico, in the county of Audrain, State of Missouri, have invented certain new and useful Improvements in Churn-Operating Mechanism; and I do hereby declare the following to be a full, clear, and exact description of the invention, such as will enable others skilled in the art to which it appertains to make and use the same.

This invention relates to churns and has for its object to improve the construction and increase the efficiency of the operating means.

Figure 1:
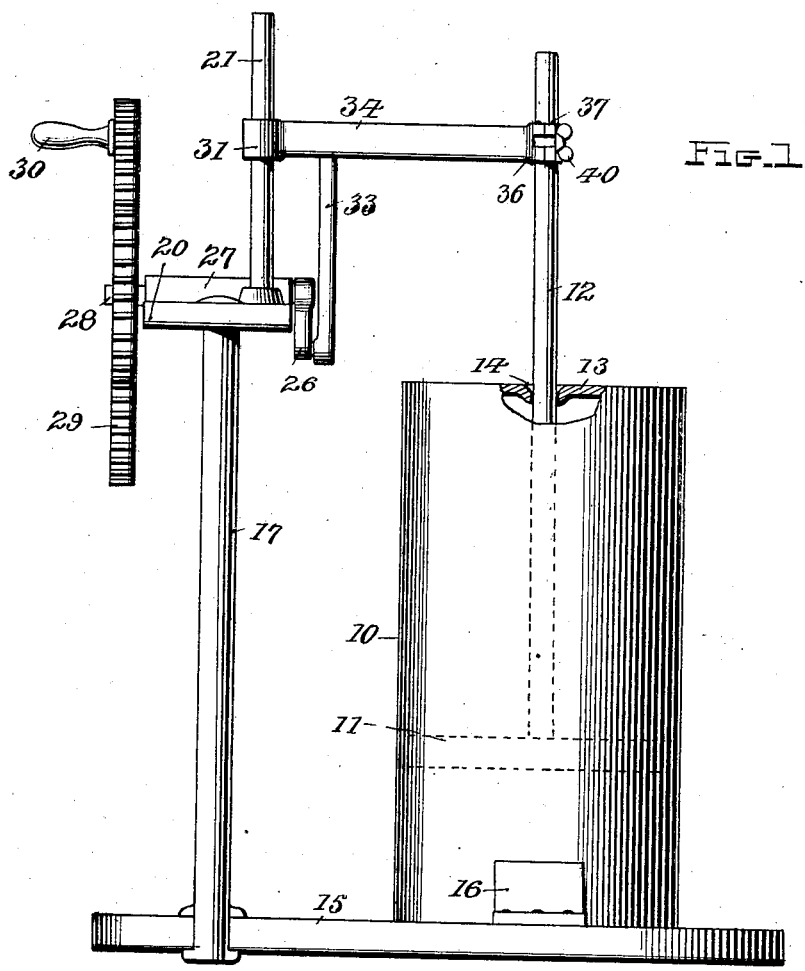
Figure 4:
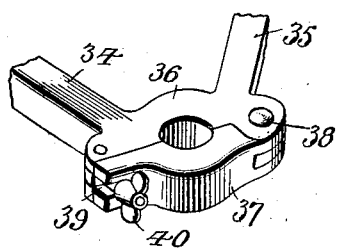

With these and other objects in view the invention consists in certain novel features of construction as hereafter shown and described and then specifically pointed out in the claims, and in the drawings illustrating the preferred embodiment of the invention, Figure 1 is a side elevation. Fig. 2 is a front elevation. Fig. 3 is a plan view of the improved device. Fig. 4 is a perspective view of a portion of the bracket.

The improved operating device may be applied to any of the various forms of churns having reciprocating dashers and for the purpose of illustration is shown applied to a conventional form of churn of this character in which 10 represents the body or cream receptacle, 11 the dasher, 12 the dasher rod, and 13 the lid of the body 10 the latter having a depression 14 where the aperture for the rod occurs to receive the cream carried up by the dasher rod and prevent it from slopping over. The churn body 10 is mounted upon a platform 15 and preferably with stop devices 16 to support the churn from lateral movement.

Rising from the platform 15 are spaced supporting standards 17—18, the standards having spaced feet 19 engaging the platform 15, and thus supporting the standards in vertical position.

Connected to the upper ends of the standards is a transverse plate or frame 20 and extending upwardly from this plate are spaced guide standards 21—22, and formed transversely of the plate 20 between the guide standards is a bearing 23 for a transverse shaft 24, the shaft having a gear pinion 25 on one end and a crank 26 on the other end, the crank coming at the side nearest to the churn body 10.

Formed in the frame 20 near one end is a bearing 27 for a stud 28, the stud providing a bearing for a gear wheel 29 meshing with the pinion 25 and provided with a handle 30, the rotation of the gear 29, it will be obvious, transmitting motion through the pinion 25 through the shaft 24 to the crank 26.

Slidably disposed upon the guide standards 21—22 is a cross head 31 having a stud 32 projecting laterally therefrom and movably connected to the stud 32 and the pin of the crank 26 is a connecting rod 33 whereby the rotary motion of the shaft 24 will impart a reciprocating motion to the cross head.

Extending from the cross head 31 are converging arms 34—35 and terminating in a half-bearing 36 in which the dasher rod 12 engages, the half-bearing having a cap 37 hinged at 38 thereto at one side and forming the opposing half-bearing to engage the churn dasher rod 12. The free end of the cap 37 is slotted at 39, while the half-bearing 36 is provided with a threaded bolt extending through the slot, and provided with a wing nut 40 engaging the bolt and bearing upon the cap, by which means a clamping device is produced to enable the dasher rod to be clamped in position relative to the cross head. By this simple means the dasher rod may be connected at any desired point to the cross head, and dasher rods of different sizes connected to the operating mechanism. By this simple means the reciprocating motion of the cross head 31 will cause the dasher rod and its dasher to move vertically within the churn body 10.

The gear 29 being larger than the pinion 25 the motion of the dasher will be quite rapid while the rotation of the handle 30 will be correspondingly slow. By this means a comparatively slow motion of the handle only is required to produce the requisite speed of the dasher, and this speed may be controlled as will be obvious by increasing or decreasing the speed of the master wheel 29.

The device is simple in construction, can be inexpensively manufactured, and applied to any of the various forms of churns having reciprocating dashers.

What is claimed, is:—

A device of the class described comprising a platform having means for supporting a churn including a dasher and its rod, supporting standards spaced apart and extending from said platform, a plate carried by said standards and provided with spaced vertical guide standards, a cross head carried by said guide standards and having laterally converging arms terminating in a bearing in which said dasher rod is supported, means for clamping the bearing to the dasher rod, a shaft mounted for rotation through said plate and having a crank at one end, a connecting rod between said crank and the cross head, and means for rotating said shaft.

In testimony whereof, I affix my signature, in presence of two witnesses.

R. E. FLEMING.

Witnesses:
FRED A. MORRIS,
WM. C. MILLER.